(12) United States Patent
Morton (10) Patent No.: US 8,433,036 B2
(45) Date of Patent: Apr. 30, 2013

(54) SCANNING SYSTEMS

(75) Inventor: Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 270 days.

(21) Appl. No.: 12/919,486

(22) PCT Filed: Feb. 25, 2009

(86) PCT No.: PCT/GB2009/000497
§ 371 (c)(1),
(2), (4) Date: Feb. 7, 2011

(87) PCT Pub. No.: WO2009/106803
PCT Pub. Date: Sep. 3, 2009

(65) Prior Publication Data
US 2011/0116600 A1    May 19, 2011

(30) Foreign Application Priority Data

Feb. 28, 2008 (GB) .................................. 0803640.2

(51) Int. Cl.
*G01N 23/04* (2006.01)
(52) U.S. Cl.
USPC ..................... 378/57; 378/98.8; 250/370.08
(58) Field of Classification Search ............ 378/19, 378/57, 86, 98.8; 250/370.08, 370.09
See application file for complete search history.

(56) References Cited

U.S. PATENT DOCUMENTS

| | | |
|---|---|---|
| 2,831,123 A | 4/1958 | Daly |
| 3,766,387 A | 10/1973 | Heffan et al. |
| 3,770,955 A | 11/1973 | Tomita et al. |
| 3,784,837 A | 1/1974 | Holmstrom |
| RE28,544 E | 9/1975 | Stein et al. |
| 3,904,923 A | 9/1975 | Schwartz |
| 4,047,035 A | 9/1977 | Dennhoven et al. |
| 4,139,771 A | 2/1979 | Dennhoven et al. |
| 4,210,811 A | 7/1980 | Dennhoven et al. |
| 4,216,499 A | 8/1980 | Kunze et al. |
| 4,366,382 A | 12/1982 | Kotowski |
| 4,430,568 A | 2/1984 | Yoshida et al. |
| 4,566,113 A | 1/1986 | Donges et al. |

(Continued)

FOREIGN PATENT DOCUMENTS

| | | |
|---|---|---|
| EP | 0287707 | 11/1982 |
| EP | 00077018 | 4/1983 |

(Continued)

OTHER PUBLICATIONS

"Mobile X-Ray Inspection Systems", Internet Citation, Feb. 12, 2007, pp. 1-2, URL:http://web.archive.org/web/20070212000928/http://www.bombdetection.com/cat_details.php?catid=20>.

(Continued)

*Primary Examiner* — Courtney Thomas
(74) *Attorney, Agent, or Firm* — Novel IP (57) ABSTRACT

The invention provides methods, systems and detector arrangements for scanning an object moving in a first direction that includes the steps of irradiating the object with radiation having a peak energy of at least 900 keV, providing a first detector region having a thickness of at least 2 mm and a second detector region having a thickness of at least 5 mm where the second detector region is arranged to receive radiation that has passed through the first detector region, and detecting the radiation after it has interacted with or passed through the object in order to provide information relating to the object.

44 Claims, 7 Drawing Sheets

U.S. PATENT DOCUMENTS

| | | |
|---|---|---|
| 4,599,740 A | 7/1986 | Cable |
| 4,626,688 A | 12/1986 | Barnes |
| 4,641,330 A | 2/1987 | Herwig et al. |
| 4,709,382 A | 11/1987 | Sones |
| 4,736,401 A | 4/1988 | Donges et al. |
| 4,788,704 A | 11/1988 | Donges et al. |
| 4,817,123 A | 3/1989 | Sones et al. |
| 4,825,454 A | 4/1989 | Annis et al. |
| 4,872,188 A | 10/1989 | Lauro et al. |
| 4,884,289 A | 11/1989 | Glockmann et al. |
| 4,979,202 A | 12/1990 | Siczek et al. |
| 4,991,189 A | 2/1991 | Boomgaarden et al. |
| 5,022,062 A | 6/1991 | Annis |
| 5,065,418 A | 11/1991 | Bermbach et al. |
| 5,091,924 A | 2/1992 | Bermbach et al. |
| 5,098,640 A | 3/1992 | Gozani et al. |
| 5,179,581 A | 1/1993 | Annis |
| 5,181,234 A | 1/1993 | Smith |
| 5,182,764 A | 1/1993 | Peschmann et al. |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis et al. |
| 5,313,511 A | 5/1994 | Annis et al. |
| 5,367,552 A | 11/1994 | Peschmann |
| 5,379,334 A | 1/1995 | Zimmer et al. |
| 5,493,596 A | 2/1996 | Annis |
| 5,548,123 A | 8/1996 | Perez-Mendez et al. |
| 5,638,420 A | 6/1997 | Armistead |
| 5,642,393 A | 6/1997 | Krug et al. |
| 5,642,394 A | 6/1997 | Rothschild |
| 5,666,393 A | 9/1997 | Annis |
| 5,687,210 A | 11/1997 | Maitrejean et al. |
| 5,692,028 A | 11/1997 | Geus et al. |
| 5,751,837 A | 5/1998 | Watanabe et al. |
| 5,764,683 A | 6/1998 | Swift et al. |
| 5,768,334 A | 6/1998 | Maitrejean et al. |
| 5,787,145 A | 7/1998 | Geus |
| 5,805,660 A | 9/1998 | Perion et al. |
| 5,838,759 A | 11/1998 | Armistead |
| 5,903,623 A | 5/1999 | Swift et al. |
| 5,910,973 A | 6/1999 | Grodzins |
| 5,930,326 A | 7/1999 | Rothschild et al. |
| 5,940,468 A | 8/1999 | Huang et al. |
| 5,974,111 A | 10/1999 | Krug et al. |
| 6,031,890 A | 2/2000 | Bermbach et al. |
| 6,058,158 A | 5/2000 | Eiler |
| 6,067,344 A | 5/2000 | Grodzins et al. |
| 6,081,580 A | 6/2000 | Grodzins et al. |
| 6,094,472 A | 7/2000 | Smith |
| 6,151,381 A | 11/2000 | Grodzins et al. |
| 6,188,747 B1 | 2/2001 | Geus et al. |
| 6,192,101 B1 | 2/2001 | Grodzins |
| 6,192,104 B1 | 2/2001 | Adams |
| 6,195,413 B1 | 2/2001 | Geus et al. |
| 6,198,795 B1 | 3/2001 | Naumann et al. |
| 6,218,943 B1 | 4/2001 | Ellenbogen |
| 6,249,567 B1 | 6/2001 | Rothschild et al. |
| 6,252,929 B1 | 6/2001 | Swift et al. |
| 6,256,369 B1 | 7/2001 | Lai |
| 6,278,115 B1 | 8/2001 | Annis et al. |
| 6,282,260 B1 | 8/2001 | Grodzins |
| 6,292,533 B1 | 9/2001 | Swift et al. |
| 6,301,326 B2 | 10/2001 | Bjorkholm |
| 6,320,933 B1 | 11/2001 | Grodzins et al. |
| 6,356,620 B1 | 3/2002 | Rothschild et al. |
| 6,424,695 B1 | 7/2002 | Grodzins et al. |
| 6,434,219 B1 | 8/2002 | Rothschild et al. |
| 6,435,715 B1 | 8/2002 | Betz et al. |
| 6,442,233 B1 | 8/2002 | Grodzins et al. |
| 6,445,765 B1 | 9/2002 | Frank et al. |
| 6,453,003 B1 | 9/2002 | Springer et al. |
| 6,453,007 B2 | 9/2002 | Adams et al. |
| 6,456,684 B1 | 9/2002 | Mun et al. |
| 6,459,761 B1 | 10/2002 | Grodzins et al. |
| 6,459,764 B1 | 10/2002 | Chalmers et al. |
| 6,473,487 B1 | 10/2002 | Le |
| RE37,899 E | 11/2002 | Grodzins et al. |
| 6,483,894 B2 | 11/2002 | Hartick et al. |
| 6,507,025 B1 | 1/2003 | Verbinski et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,580 B1 | 4/2003 | Carver et al. |
| 6,546,072 B1 | 4/2003 | Chalmers |
| 6,552,346 B2 | 4/2003 | Verbinski et al. |
| 6,563,903 B2 | 5/2003 | Kang et al. |
| 6,580,778 B2 | 6/2003 | Meder |
| 6,584,170 B2 | 6/2003 | Aust et al. |
| 6,597,760 B2 | 7/2003 | Beneke et al. |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers et al. |
| 6,663,280 B2 | 12/2003 | Doenges |
| 6,665,373 B1 | 12/2003 | Kotowski et al. |
| 6,665,433 B2 | 12/2003 | Roder |
| 6,763,635 B1 | 7/2004 | Lowman |
| 6,785,357 B2 | 8/2004 | Bernardi et al. |
| 6,812,426 B1 | 11/2004 | Kotowski et al. |
| 6,816,571 B2 | 11/2004 | Bijjani et al. |
| 6,837,422 B1 | 1/2005 | Meder |
| 6,839,403 B1 | 1/2005 | Kotowski et al. |
| 6,843,599 B2 | 1/2005 | Le et al. |
| 6,920,197 B2 | 7/2005 | Kang et al. |
| 7,039,159 B2 | 5/2006 | Muenchau et al. |
| 7,166,844 B1 | 1/2007 | Gormley et al. |
| 7,207,713 B2 | 4/2007 | Lowman |
| 2004/0017888 A1 | 1/2004 | Seppi et al. |
| 2004/0086078 A1 | 5/2004 | Adams et al. |
| 2004/0125914 A1 | 7/2004 | Kang et al. |
| 2004/0141584 A1 | 7/2004 | Bernardi et al. |
| 2004/0258198 A1 | 12/2004 | Carver et al. |
| 2005/0117700 A1 | 6/2005 | Peschmann |
| 2005/0135668 A1 | 6/2005 | Polichar et al. |
| 2005/0156734 A1 | 7/2005 | Zerwekh et al. |
| 2005/0169421 A1 | 8/2005 | Muenchau et al. |
| 2006/0284094 A1 | 12/2006 | Inbar |
| 2007/0110215 A1 | 5/2007 | Hu et al. |
| 2007/0172129 A1 | 7/2007 | Tortora |
| 2007/0210255 A1 | 9/2007 | Bjorkholm |
| 2007/0269005 A1 | 11/2007 | Chalmers et al. |
| 2007/0280416 A1 | 12/2007 | Bendahan et al. |
| 2007/0280502 A1 | 12/2007 | Paresi et al. |
| 2007/0286337 A1 | 12/2007 | Wang et al. |
| 2008/0044801 A1 | 2/2008 | Modica et al. |
| 2008/0304622 A1 | 12/2008 | Morton |

FOREIGN PATENT DOCUMENTS

| | | |
|---|---|---|
| EP | 0176314 | 4/1986 |
| GB | 2255634 | 11/1992 |
| WO | WO9855851 | 10/1998 |
| WO | WO2006/036076 | 4/2006 |
| WO | WO2006/045019 | 4/2006 |
| WO | WO2006/078691 | 7/2006 |
| WO | WO2007/051092 | 5/2007 |

OTHER PUBLICATIONS

Molchanov et al., "Nanosecond Gated Optical Sensors For Ocean Optic Applications," Sensors Applications Symposium, 2006, Proceedings of the 2006 IEEE, Feb. 7, 2006, 147-150.

International Search Report PCT/GB2009/000515, Feb. 23, 2010, Rapiscan Security Products, Inc.

Search Report PCT/GB2009/000497, Jan. 26, 2010, Rapiscan Security Products, Inc.

International Search Report PCT/GB2009/001444, Dec. 17, 2009, Rapiscan Security Products.

Search Report for WO2009/106847, Sep. 3, 2009, Rapiscan Security Products.

| r-a | r-b | r-c | |
|---|---|---|---|
| f-b | f-c | f-d | |
| r-a | r-b | r-c | |
| f-a | f-b | f-c | |
| r-a | r-b | r-c | |
| | | | |

Figure 14a

| ra | ra' | rb | rb' |
|---|---|---|---|
| fb | fb' | fc | fc' |
| ra | ra' | rb | rb' |
| fb | fb' | fc | fc' |
| ra | ra' | rb | rb' |
| | | | |

SCANNING SYSTEMS

CROSS REFERENCE

The present application is a national stage application of PCT/GB2009/000497, filed on Feb. 25, 2009, which further relies on Great Britain Patent Application Number 0803640.2, filed on Feb. 28, 2008, for priority. The applications are herein incorporated by reference in their entirety.

FIELD OF THE INVENTION

The present invention relates to scanning systems. It has particular application in scanning systems for cargo, but can also be used in scanners for other applications such as security and high energy medical scanners.

BACKGROUND OF THE INVENTION

There exists a requirement to screen containers for the presence or otherwise of illegal materials and devices. Often such containers are large (for example a 40 ft×8 ft×8 ft ISO container) and may contain dense loads such as machinery. In order to provide a non-intrusive and fast inspection process, a number of imaging systems have been developed that use high energy X-ray sources to penetrate through even large containers.

Typically these systems combine a high energy X-ray linear accelerator source with a series of X-ray detectors arranged in a linear fashion to create a one-dimensional inspection line through the object. By scanning the object through the X-ray beam at a controlled velocity, a set of one-dimensional projections are collected which can then be re-formatted into a two-dimensional image for subsequent operator review.

In all such known systems, the image collecting process is inherently undersampled according to the Nyquist sampling theorem which states that the data should be sampled at twice the rate of the highest bandwidth in the signal.

Also, X-ray scanners for cargo inspection typically comprise a high energy X-ray source (usually based on an X-ray linear accelerator) with a beam quality of 1 MeV to 9 MeV. The X-ray output from the X-ray linear accelerator is then collimated down to a narrow fan-beam of radiation which is shone through the item of cargo under inspection. A linear array of X-ray detector elements is then positioned opposite to the X-ray source such that it is irradiated by the fan-beam of radiation after attenuation of the X-ray beam by the object under inspection.

SUMMARY OF THE INVENTION

In some embodiments of the present invention, an enhanced detection array is described which provides full Nyquist sampling of the image data. In further embodiments, the detection array is further modified to provide materials discrimination capability which can provide significant assistance to the operator in their decision making.

One aspect of the invention provides a scanning method for scanning an object moving in a first direction comprising: irradiating the object with radiation; providing a first detector region and a second detector region wherein the second detector region is arranged to receive radiation that has passed through the first detector region; detecting the radiation after it has interacted with or passed through the object in order to provide information relating to the object; wherein detecting the radiation comprises: detecting radiation at the first detector region; receiving radiation that has passed through the first detector region at the second detector region; detecting radiation at the second detector region; wherein at the first detector region, the second detector region, or both, detecting the radiation comprises capturing a plurality of sets of detection data using different groups of detection elements, each detection element being arranged to provide information relating to a corresponding portion of the object, and each set of detection data being captured at a different time such that each group of detection elements is arranged to provide information on the same region of the object; and wherein the corresponding portions covered by each group are overlapped in a second direction having a component normal to the first direction.

In one embodiment, the present invention is directed toward a scanning method for scanning an object moving in a first direction comprising: irradiating the object with radiation having a peak energy of at least 900 keV; providing a first detector region having a thickness of at least 2 mm and a second detector region having a thickness of at least 5 mm wherein the second detector region is arranged to receive radiation that has passed through the first detector region; detecting the radiation after it has interacted with or passed through the object in order to provide information relating to the object; wherein detecting the radiation comprises a) detecting radiation at the first detector region; b) receiving radiation that has passed through the first detector region at the second detector region; and c) detecting radiation at the second detector region. At the first detector region, the second detector region, or both, detecting the radiation comprises capturing a plurality of sets of detection data using different groups of detection elements, where each detection element is arranged to provide information relating to a corresponding portion of the object, each set of detection data is captured at a different time such that each group of detection elements is arranged to provide information on the same region of the object, and the corresponding portions covered by each group are overlapped in a second direction having a component normal to the first direction.

Optionally, the first detector region has a thickness of about 15 mm, and the second detector region has a thickness of about 30 mm. The method further comprises the step of sensing the rate of movement of the object in order to coordinate timing of the capturing of the sets of detection data. The corresponding portions covered by each group are overlapped to provide information at a spatial frequency sufficient to scan the region of the object at least the Nyquist sampling rate in the second direction. The detection elements have substantially the same length in the second direction and the overlapped portions are overlapped such that, on average, data relating to two portions is captured per length of detection element.

The different groups of detection elements are offset relative to each other in the first direction. The method comprises providing time-coordinated scan information to imaging means arranged to provide an image of the object. The method comprises controlling movement of the object such that the region is aligned with the relevant group of detection elements at the time of data capture. The method comprises capturing data at a temporal frequency sufficient to provide scanning of the region of the object at least the Nyquist sampling rate in the first direction.

Irradiating the object comprises irradiating the object in discrete bursts and the scanning method comprises sending detected information received in response to a burst from the detection element before the next burst occurs. The method comprises positioning the first detector region between the object and the second detector region. The method comprises calculating the ratio of radiation detected at the first detector region relative to radiation detected at the second detector region in order to the determine information relating to the object based upon the calculated ratio. The method comprises configuring the first detector region and the second detector region to detect a predetermined amount of radiation relative to each other.

The method comprises configuring the first detector region and the second detector region to detect substantially the same amount of radiation as each other. The method comprises configuring any one or more of size, shape or material of the or each detector region so that the first detector region and the second detector region detect the predetermined amount of radiation relative to each other.

In another embodiment, the present invention is directed toward a detector arrangement for use in a scanning system, the system comprising a radiation source arranged to irradiate with radiation having a peak energy of at least 900 keV an object, moving in a first direction, to be scanned, wherein the detector arrangement is arranged to detect radiation after it has interacted with or passed through the object in order to scan the object; wherein the detector arrangement comprises a first detector region having a thickness of at least 2 mm and arranged to detect radiation and a second detector region having a thickness of at least 5 mm and arranged to detect radiation wherein the second detector region is arranged to receive radiation that has passed through the first detector region; wherein the first detector region, the second detector region, or both comprise a detector array comprising a plurality of groups of detection elements, each detection element arranged to capture detection data relating to a corresponding portion of the object, each group being arranged to capture a set of detection data at a different time such that each set of detection data covers the same region of the object; and wherein at least two of the sets of portions are overlapped in a second direction having a component normal to the first direction.

The first detector region has a thickness of about 15 mm, and the second detector region has a thickness of about 30 mm. The sets of portions are overlapped to provide information at a spatial frequency sufficient to scan the object at least the Nyquist sampling rate in the second direction. The detection elements have substantially the same length in the second direction and the overlapped portions are overlapped such that, on average, data relating to two portions is captured per length of detection element. The different groups of detection elements are offset relative to each other in the first direction. Each group comprises an identical set of detection elements. The groups comprise columns of detection elements extending in the second direction. The width of a column is one detection element. The groups are arranged adjacent to each other. The groups are spaced apart. The detection elements comprise scintillation crystals. The first detector region is positioned between the object to be scanned and the second detector region.

The first detector region and the second detector region are configured to detect a predetermined amount of radiation relative to each other. The first detector region and the second detector region are configured to detect substantially the same amount of radiation as each other. Any one or more of size, shape or material of one or each detector region is arranged so that the first detector region and the second detector region detect the predetermined amount of radiation relative to each other.

The detector arrangement comprises a first detector including the first detector region and a second detector including the second detector region. The first detector is mounted on first mounting means arranged to mechanically support the detector or provide an electronic connection between the first detector and an information output circuit or both and the second detector is mounted on second mounting means arranged to mechanically support the detector or provide an electronic connection between the second detector and an information output circuit or both.

The first detector and the second detector are mounted upon joint mounting means arranged to mechanically support the detectors or provide an electronic connection between the detectors and one or more information output circuits or both. Any one or more of the mounting means comprises a circuit board. The first detector is mounted upon a first side of the circuit board and the second detector is mounted upon a second opposite side of the circuit board. One or each of the first detector and the second detector comprises a linear detector array.

In another embodiment, the present invention is directed toward a scanning system comprising a radiation source arranged to irradiate with radiation having a peak energy of at least 900 keV an object, moving in a first direction, to be scanned, a detector arrangement arranged to detect radiation after it has interacted with or passed through the object in order to provide information to scan the object, wherein the detector arrangement comprises an aforementioned detector arrangement.

The scanning system comprises a movement sensor arranged to sense the rate of movement of the object in order to coordinate timing of the capturing of the sets of detection data such that the groups of detector elements capture different data sets relating to the same region of the object.

The scanning system comprises a controller arranged to control movement of the object through the scanning zone so that the groups of detector elements capture different data sets relating to the same region of the object. The scanning system comprises a controller arranged to communicate with the movement sensor and control time of capture of data by a group of detector elements to coordinate with movement of the object through the scanning zone so that the groups of detector elements capture different data sets relating to the same region of the object.

The scanning system comprises a controller arranged to calculate the ratio of radiation detected at the first detector region relative to radiation detected at the second detector region in order to the determine information relating to the object based upon the calculated ratio. The scanning system comprises a plurality of detector arrangements. One or each detector arrangement comprises a face upon which the radiation is arranged to impact and the face is arranged to face towards the radiation source.

The imaging method comprises aligning different sets of detection data which have been captured at different times and which provide information on the same region of the object in order to provide the image.

The independent claims define aspects of the invention for which protection is sought. The dependent claims define preferable inventive features. Any of the features of the dependent claims may be used in combination with the features of other claims or other aspects of the invention, even if they are not explicitly dependent upon them—this will be clear to a person skilled in this field.

Where a feature is claimed in one category (e.g. method, system, detector arrangement, etc.) protection is sought for that feature in other categories even if not explicitly claimed.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
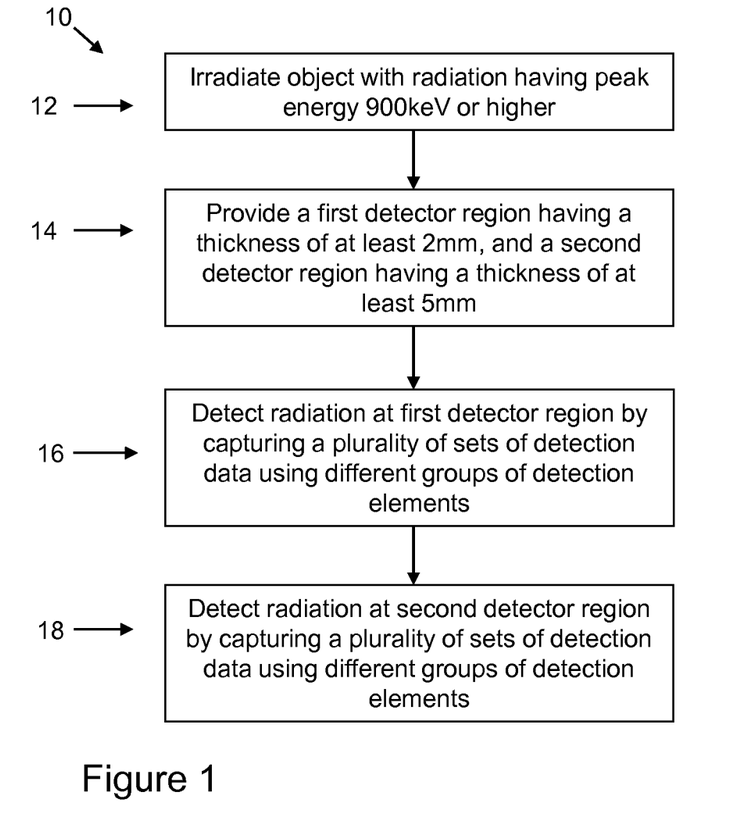
FIG. 1 is a flowchart outlining a method according to an embodiment of the invention.
Figure 2:
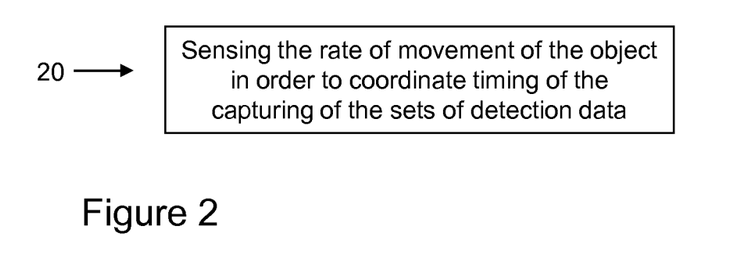
FIG. 2 is a flowchart outlining another method according to an embodiment of the invention.
Figure 3:
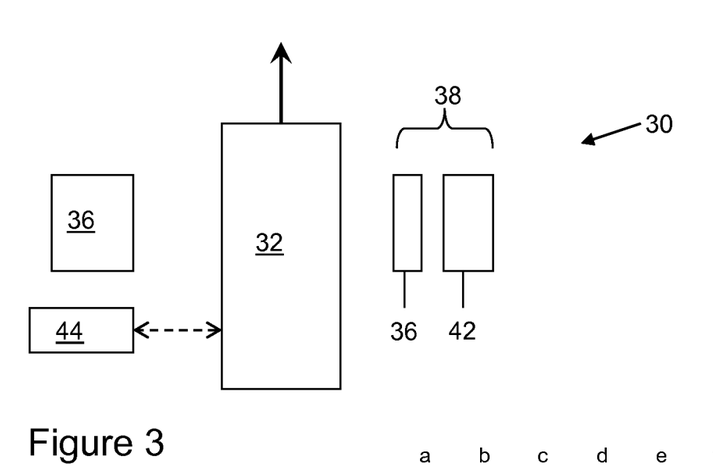
FIG. 3 schematically shows a scanning system according to an embodiment of the invention.

Referring to FIGS. 1 and 3, an embodiment of the invention provides a method 10 and system 30 for scanning an object 32 moving in a first direction. The system 30 comprises a radiation source 36 arranged to irradiate the object 32 with radiation as the object moves in the first direction. The radiation source is arranged to provide radiation having a peak energy of at least 900 keV. The scanning system 30 also comprises a detector arrangement 38. The detector arrangement is arranged to detect radiation after it has interacted with or passed through the object 32 in order to provide information to scan the object. The detector arrangement 38 comprises a first detector 40 and a second detector 42. The first detector 40 has a thickness of at least 2 mm. In this embodiment the thickness of the first detector is about 15 mm. In other embodiments the thickness may be more or less and can be tuned as required by a skilled person. The second detector 42 has a thickness of at least 5 mm. In this embodiment the thickness of the second detector 42 is about 30 mm. Once again, it will be clear to the skilled person that this detector thickness can be varied by experimentation in order to tune the detector arrangement 38 as required. In this embodiment, referring to FIG. 3, the first detector 40 is positioned between the object 32 and the second detector 42. In other embodiments, the skilled person may envisage a different arrangement. In this particular embodiment, this arrangement provides a simple geometry in order to achieve the desired detector configuration such that radiation passing through the first detector 40 reaches the second detector 42 after it has interacted with the object 32.

The system 30 in its broadest embodiment does not include a movement sensor. In some embodiments, the system 30 does include a movement sensor 44 as shown in FIG. 3. The movement sensor 44 is arranged to measure any one or more of the position, speed, velocity or acceleration of the object 32. The role of the movement sensor 44 will be discussed in further detail below.

Referring to FIG. 1, the scanning method 10 comprises the step 12 of irradiating an object to be scanned with radiation having a peak energy value of 900 keV or more. The method 10 also comprises the step of providing 14 a first detector region having a thickness of at least 2 mm, and a second detector region having a thickness of at least 5 mm. The second detector region is arranged to receive radiation that has passed through the first detector region. The method 10 comprises detecting the radiation after it has interacted with or passed through the object in order to provide information relating to the object. Detecting the radiation comprises detecting 16 radiation at the first detector region by capturing a plurality of sets of detection data using different groups of detection elements and detecting 18 radiation at the second detector region by capturing a plurality of sets of detection data using different groups of detection elements.

Each detection element is arranged to provide information relating to a corresponding portion of the object and each set of detection data is captured at a different time such that each group of detection elements provides information on the same region of the object. Corresponding portions covered by each group are overlapped in a second direction, which has a component normal to the first direction.

Figure 4:
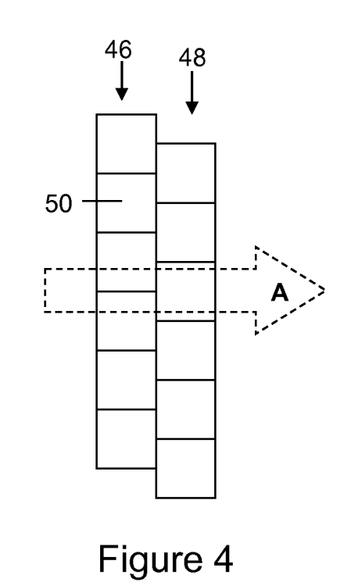
FIG. 4 schematically shows an off-set staggered detector array.

Referring to FIG. 4, a portion of the first detector 40 is shown. Here, the portion of the first detector 40 is viewed from the point of view of the X-ray source and is seen to comprise two rows of X-ray detector elements 50; a leading row 46 and a trailing row 48. The object is scanned through the X-ray beam past the two detector rows in the direction of the arrow, A. Each row is shown with only a few detector elements for clarity although in a full-scale imaging system, each row will typically contain hundreds to thousands of detection elements. In this embodiment, the elements are identical. In other embodiments, they may be different (sizes, shapes etc) as required.

Figure 5:
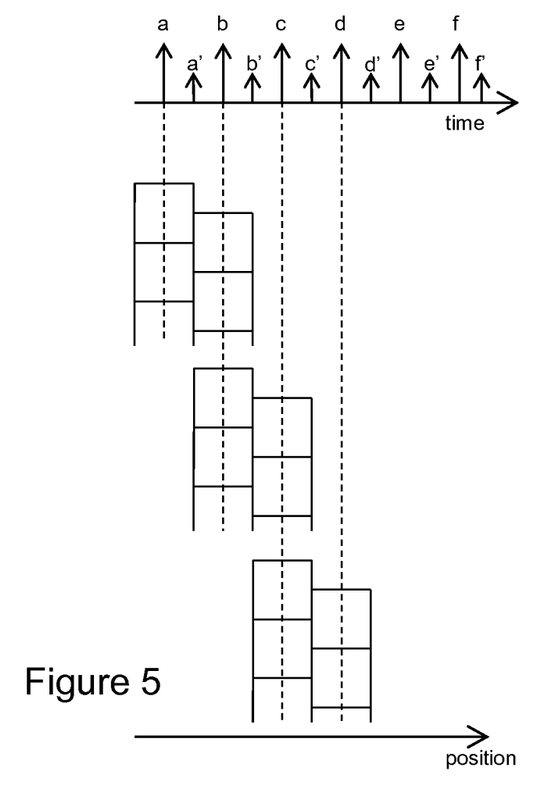
FIG. 5 schematically illustrates how data capture is co-ordinated in an embodiment of the present invention.

Information generated by the X-ray detector elements must be read out in a time correlated manor with the scanning of the object; the faster the object is scanned, the faster each row of data must be read out. The relationship between the scanning speed of the object and the rate at which the detector must be read out is shown in FIG. 5. The vertical arrows at the top of the figure indicate the times at which the X-ray source produces bursts (at a, b, c, d, e, f) of signal and the data from the detector is read out prior to the start of the next X-ray burst. The X-ray pulse labelled "a" will illuminate both the leading and trailing detector arrays. The next X-ray pulse (labelled "b") will also illuminate both leading and trailing arrays. This means that the data collected for the trailing array in pulse "b" fits exactly in line with the data that was collected for the leading array during pulse "a".

To this end, in some embodiments, the method 10 comprises sensing 20 the rate of movement of the object in order to co-ordinate timing of the capturing of the sets of detection data. In such embodiments, there may be a control mechanism in order to adjust the timing of the X-ray bursts from the source 36 taking into account the movement of the object 32 as sensed by the movement sensor 44. For example, if the object 32 comprises a lorry, the movement sensor 44 is able to judge the speed at which the lorry is travelling and adjust the timing of the X-ray bursts from the X-ray source 36 accordingly in order to gather detection data such that each group of detection elements provides information on the same region of the object.

In this embodiment, since the centres for the detector elements in the leading detector array are offset along the length of the array by exactly half a detector element from those in the trailing array, it can be seen that the vertical sampling of the X-ray signal is twice what it would have been had a single detector row been used as is currently the case in known cargo inspection systems.

The spatial frequency bandlimit of the detector array is determined by the physical aperture of the individual detector elements. It can be shown that the arrangement of detectors in FIG. 4 exactly meets the Nyquist sampling theorem requirement in the vertical direction when sampled in the time domain as described above.

Using the same offset staggered detector array as is shown in FIG. 4, it is also possible to satisfy the Nyquist sampling theorem in the horizontal direction. In this case, the X-ray beam pulse rate must be doubled while maintaining the same scan velocity as shown in FIG. 5. These additional pulse are shown as a', b', c' and so on in FIG. 5.

In another embodiment of the present invention, an offset staggered detector array is proposed with both vertical and horizontal sampling modes selectable during system operation.

Vertical sampling to the Nyquist criteria is typically always utilised. Horizontal sampling can be operated with full Nyquist sampling when best image quality is required and at other lower sampling rates when low dose imaging is required.

Figure 6:
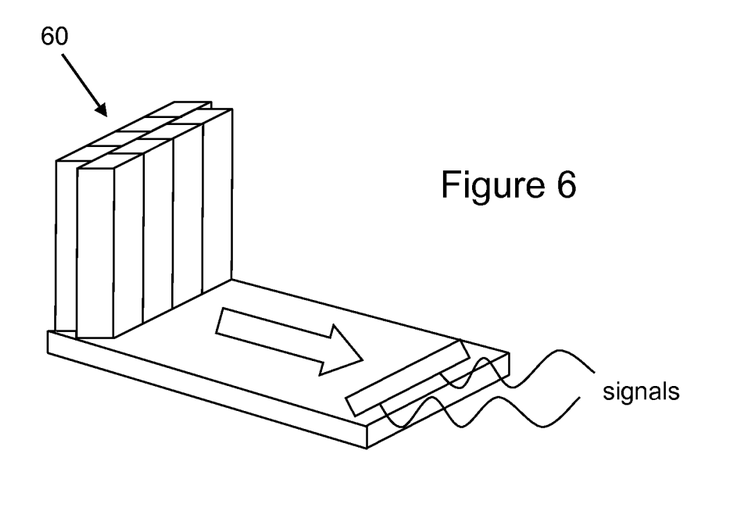
FIG. 6 schematically illustrates a detector module used in an embodiment of this invention.

In another embodiment of the invention, a detector module may be fabricated such as the example shown in FIG. 6. Here an offset staggered detector array 60 is formed from an array of scintillation crystals. A scintillation crystal emits light under exposure to X-radiation and this light is transmitted through the bulk of the scintillation material to a photosensitive device which converts the input optical signal to an electrical current for subsequent integration by an electronic circuit. The integrated signal can then by converted to digital form for transfer to a digital circuit which is able to render the data to a human readable form such as an image and is also able to store the data to a digital archive such as a computer disk. Typical scintillation detectors should have high density and high atomic number and would typically be selected from the set of materials that include CsI, NaI, BGO, CdWO4, LSO, GSO, LYSO and LaBr3. Often the photosensitive device will be a semiconductor device such as a photodiode, an avalanche photodiode or a silicon photomultiplier or it may be a vacuum tube device such as a photomultiplier tube or a more exotic hybrid device such as a micro-channel plate with photodiode readout.

Other detector configurations are possible, for example by using a gas filled ionisation or proportional detector such as one filled with pressurised Xenon gas. To achieve the required detection efficiency the gas would normally be pressured to at least 5 bar. An alternative would be to use a high density wide bandgap semiconductor material such as CdTe, CdZnTe, HgI and so on.

Exactly the same offset staggered detector array principle can be used with other imaging probes including thermal neutrons and fast neutrons which can provide additional diagnostic benefit.

In another embodiment of this invention, a hybrid imaging system is envisaged in which an offset staggered X-ray sensitive detector array is situated proximate to an offset staggered neutron sensitive detector array to allow simultaneous X-ray and neutron imaging inspection of the same container.

The primary equation that governs X-ray attenuation in matter (e.g. as the radiation from the source pulses through the object and each detector) is $$I(E) = I_0(E)\exp\left(-\int_l \mu(E)\,dl\right) \quad (1)$$

where I(E)=intensity of radiation transmitted through the object at energy E, Io(E)=intensity of radiation emitted by the source at energy E, μ(E)=linear attenuation coefficient of object at energy E and l=line taken by the (pencil) beam of radiation through the object.

Figures 15, 16:
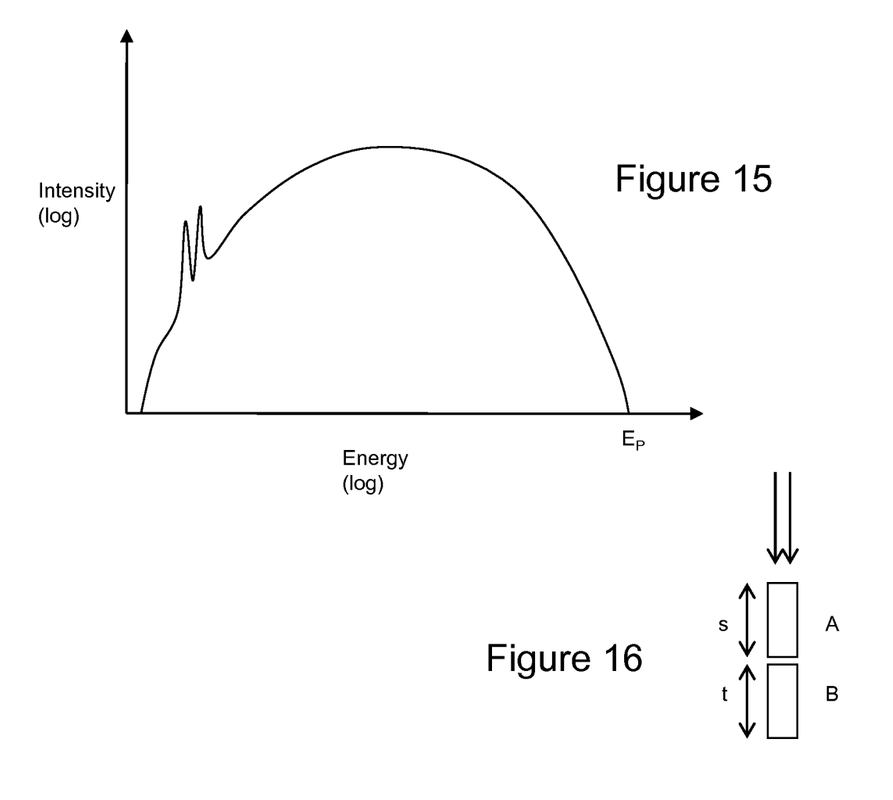
FIG. 15 graphically illustrates an output radiation profile from a radiation source used in an embodiment of the present invention.
FIG. 16 schematically illustrates a detector arrangement according to an embodiment of the invention.

The X-ray output from an X-ray linear accelerator is polychromatic having an energy distribution substantially as shown in FIG. 15. The maximum X-ray energy ($E_p$) results from those electron interactions in the target of the linear accelerator where all of the electron energy is transferred to a single X-ray photon. Typically, less than the full electron energy is transferred to a photon resulting in the broad range of X-ray energies in the X-ray beam. At low energy, the peaks shown in FIG. 15 are due to fluorescence interactions between the electrons and the target atoms so resulting in X-rays which are characteristic of the target material.

It is customary to use an integrating detector to measure the X-ray signal that is described in equation 1. In this case, the detected signal can be written as $$I_d = \int_0^{E_p} I(E)\left[1 - \exp\left(-\int_s \mu_d(E)\,ds\right)\right] \quad (2)$$

where $I_d$=detected signal, $\mu_d(E)$=linear attenuation coefficient of the detector material at energy E and s=path length of the X-ray beam through the detector.

It is therefore clear that $I_d$ retains no knowledge of the energy distribution of the incoming X-ray beam, only of the cumulative effect of all X-ray energies.

However, it can also be seen that unless the path through the detector material, s, is very large indeed, some energy will be transmitted through the detector (i.e. it will not have a 100% detection efficiency). Referring to FIG. 16, if a second detector is placed at the output of the first detector, then the energy transmitted through the first detector has a chance of being absorbed in the second detector. In this case we can write:

$$I_{dB} = \int_0^{E_p} I(E)\exp\left(-\int_s \mu_{dA}(E)\,ds\right)\left[1 - \exp\left(-\int_t \mu_{dB}(E)\,dt\right)\right] \quad (3)$$

where $I_{dB}$=intensity recorded in detector B, $\mu_{dA}(E)$=linear attenuation coefficient of detector A material at energy E, $\mu_{dB}(E)$=linear attenuation coefficient of detector B material at energy E and t=path taken by the X-ray beam through detector B.

Inspection of equation 3 shows that the energy spectrum that is incident on detector B is not the same as the energy spectrum that is incident on detector A. Therefore, detector A can be thought to have retained some energy information even though the integrated output alone is not sufficient to tell what this energy information is. The same is true of detector B.

In another aspect of this invention, it is recognised that the measurements that are produced by detector A and detector B are spatially and temporally correlated and that the ratio of the intensity recorded in detector A to that recorded in detector B will necessarily provide some information about the energy distribution of the incident X-ray beam, i.e.

$$\frac{I_{dA}}{I_{dB}} = f\{I(E)\} \quad (4)$$

where f{ }=function operator.

It can further be seen through inspection of equation (1), that the ratio of detector measurements also includes a factor that is due to attenuation in the object.

Three object parameters will affect the ratio of detectors (equation 4) and these are the linear attenuation coefficient of the object, $\mu(E)$, the path/taken by the X-ray beam through the object and the energy distribution of the primary beam, $Io(E)$. In this situation, there are three unknowns and two measurements and therefore it is impossible to uniquely determine a value for the three object unknowns. The energy distribution of the primary beam, $Io(E)$ is constant from one scan to the next and so an estimate of $Io(E)$ to the first order can be made. Therefore $Io(E)$ is assumed to be known and basic materials discrimination which results in an average atomic mass indication for the object being analysed.

The present invention is concerned with high energy scanning. At low energies (for example most medical scanners), the photo-electric effect is a mechanism by which X-rays interact with matter within objects being scanned. In contrast, the present invention is concerned with much larger X-ray source energies—namely having a peak value of 900 keV or above. The predominant mechanism governing interactions of radiation within matter at these energies is Compton scattering.

The attenuation in matter of X-rays affected by the photo-electric effect shows a dependence proportional to $Z^4$ (where Z=atomic number). In contrast, Compton scattering produces a $Z^1$ dependence. Some Compton scattering is also present at low energies.

The detector regions of the present invention are configured such that in the front detector 40, there is approximately a $Z^4$ dependence arising from a combination of the photo-electric and Compton scattering effects. The second, rear detector 42 has a $Z^1$ dependence. As a result there are significantly different considerations compared to low energy X-ray scanning, due to the different physical laws governing the interaction of matter. The inventor has realised that for high energy X-ray scanning applications, the front and rear detectors in the claimed arrangement are governed by different physical laws with regards to their interaction with high energy radiation. As a result of the different physical relationships, different detector arrangements are required, relative to low energy X-ray scanners. Accordingly, a first detector is specified as being at least 2 mm thick, whilst the second detector is specified as being at least 5 mm thick. Also, different signal processing is required to account for the combination of the photo-electric effect and Compton scattering occurring at the first detector, and the predominantly Compton scattering effect at the second detector. As a result conventional cargo scanners do not use a dual detector region arrangement as specified in this invention.

Figure 7:
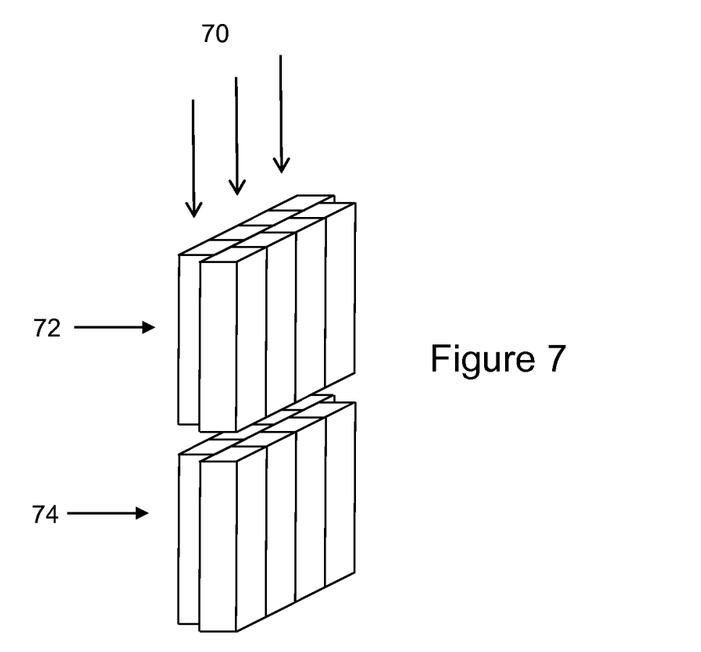
FIG. 7 schematically illustrates a stacked detector arrangement according to an embodiment of this invention.

As a further embodiment of this invention, a dual-energy sensor array as shown in FIG. 7 is described. Here, the radiation beam 70 impacts through the long edge of a first offset staggered row of detector elements. The thickness of the first offset staggered detector array 72 is tuned to allow a fraction of the incident radiation to penetrate through the detector elements so that the radiation beam can then intercept a second offset staggered row 74 of detector elements.

In some embodiments, the X-ray beam is generated by using an X-ray Linear Accelerator. The beam has a wide energy spectrum. The maximum X-ray energy in the X-ray spectrum is equal to the peak accelerating potential of the linear accelerator (e.g. 6 MeV in some embodiments) but the mean X-ray energy in the spectrum is typically only one third of the peak (e.g. 2 MeV) and the most probable X-ray energy is much less than this still. In other embodiments, the peak energy is 900 keV, or any suitable higher peak energy.

By adopting the stacked approach shown in FIG. 7, the front offset staggered row 72 of detector elements pre-filter the X-ray beam and preferentially detect the low energy component of the X-ray signal. The X-ray signal that penetrates through to the rear offset staggered row of detector elements therefore has a higher net energy spectral content than that detected in the front offset staggered row of detectors. This change in energy response of the two sets of detectors is summarised in the diagram shown in FIG. 9.

Figure 9:
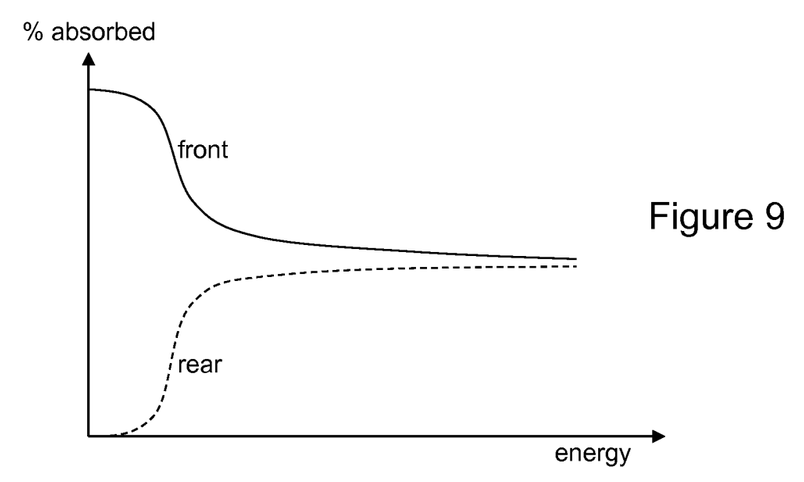
FIG. 9 is a graph illustrating the change in response relative to the energy of received radiation.

In FIG. 9 in this particular embodiment the front and rear detector thicknesses have been tuned to give a similar overall detection probability which is advantageous in the design of the subsequent data acquisition system.

Figure 8:
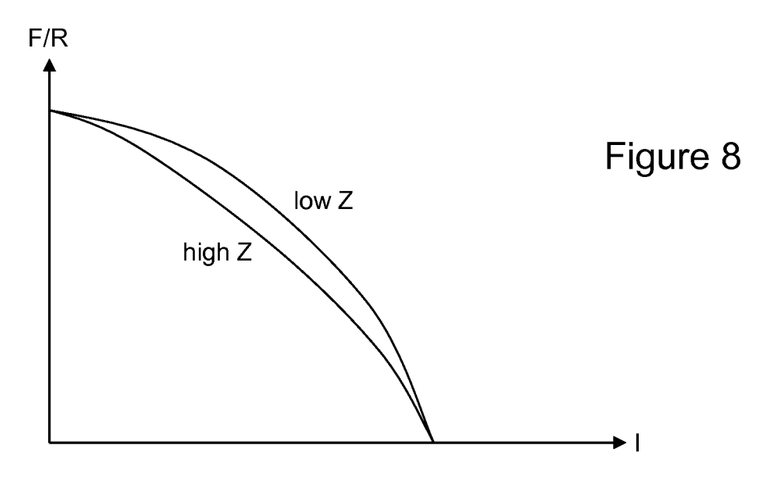
FIG. 8 is a graph illustrating different characteristics of high and low atomic mass objects as seen by the scanning system of an embodiment of this invention.

By then comparing the ratio of the signal detected in the front detector element with that detected by the corresponding rear detector element, it is possible to perform some basic materials discrimination. The representative effect on the Front-to-Rear (F/R) detected signal ratio as a function of material thickness for high and low atomic number (Z) materials is shown in FIG. 8. At lower energies there is no significant differentiation between low and high atomic number materials since almost all radiation is absorbed at the front (F) detector regardless of atomic number of the material. At larger energies the differences between materials is more pronounced. At much larger energies, the differentiation becomes less significant.

Taking the absolute values detected by the front and rear detector sets provides the system with an estimate of the total radiological thickness of the object under inspection. The F/R ratio then provides an assessment of whether the object in the image is a small thickness of high-Z material or a large thickness of low-Z material. In this way, a basis assessment of materials type can be performed automatically.

It is noted that the dual energy approach described here applies equally well to other detector configurations such as a single row linear array.

Figure 10:
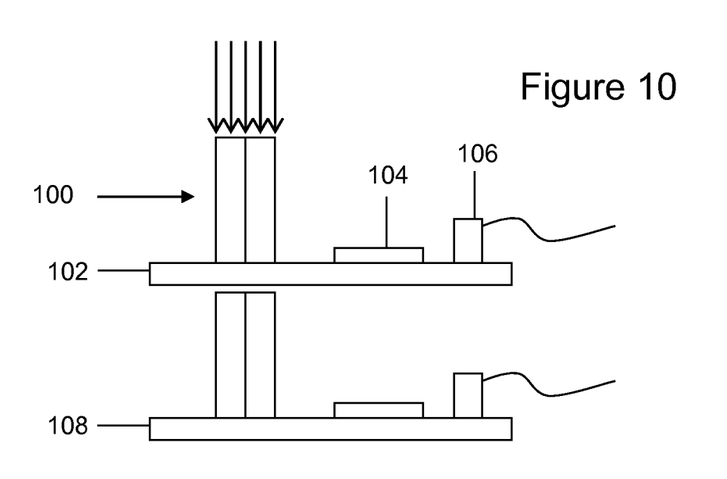
FIG. 10 illustrates a detector arrangement according to an embodiment of the invention.

Another embodiment of this invention may use two independent data acquisition systems, one to read out the front detector array data and one to read out the rear detector array data as shown in FIG. 10 where just the detector component of the data acquisition system is shown. Here, an X-ray detector arrangement 100 is populated onto a circuit card 102 which provides mechanical support for the detector as well as providing the necessary electronic readout 104 and cable interface 106. Two identical cards 102, 108 complete the dual energy detector configuration.

Figure 11:
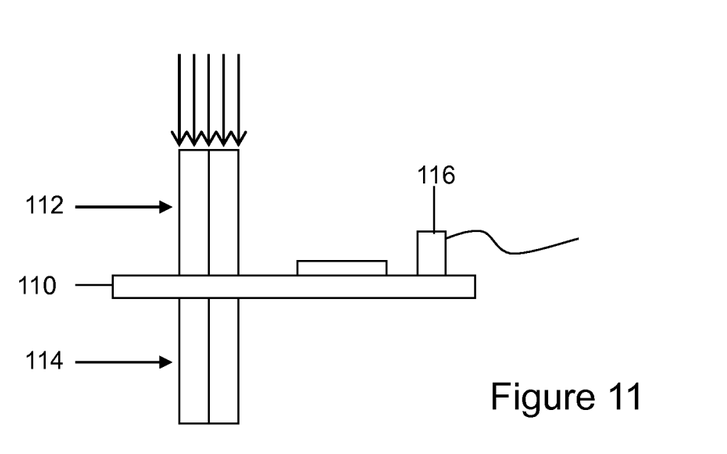
FIG. 11 illustrates a detector arrangement according to another embodiment of the invention.

Another practical embodiment of this invention is shown in FIG. 11. Here, a single circuit card 110 is used to provide the mechanical and electrical interface to two detector arrays 112, 114, i.e. both front and rear. A single cable connection 116 takes data from both detector arrays off to a single data acquisition system. Typically, the front and rear detector data is interleaved and is re-formatted by digital components of the data acquisition system down-stream of the front end detector modules.

In some embodiments, the detector module will provide mechanical, environmental and thermal protection for the sensitive front end radiation detectors. To facilitate quantitative imaging, it is beneficial for the front and rear detector elements to be maintained at equal temperatures.

Figure 13:
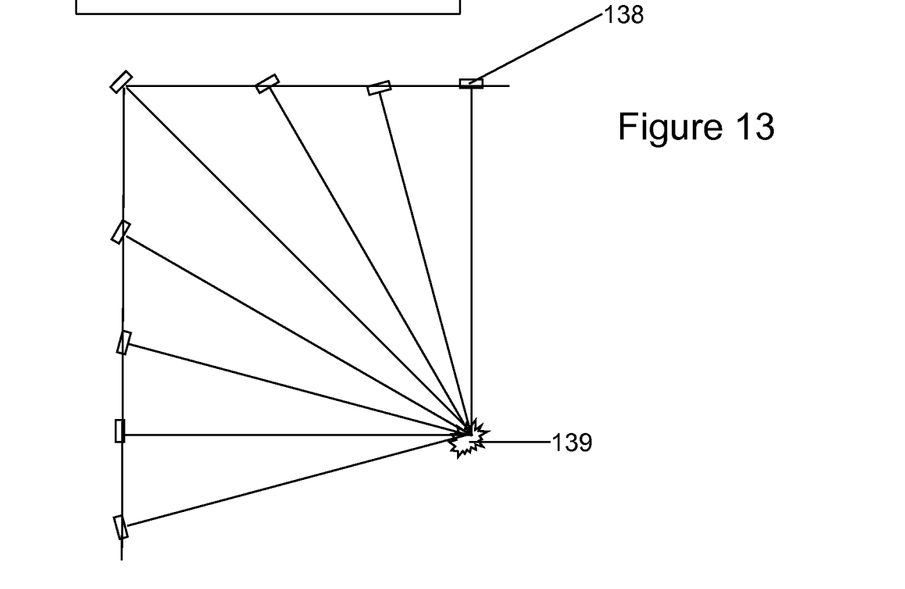
FIG. 13 schematically shows an example of an array of detectors arranged according to an embodiment of the invention.

Further, in some embodiments the detectors point substantially back towards the source of radiation in order to limit parallax detection of the radiation beam. This can be achieved quite simply by using the "saw-tooth" arrangement that is shown schematically in FIG. 13. Here, the normal to each detector array 138 points back towards the source 139 so that parallax error can by typically contained to within a few degrees.

Figure 12:
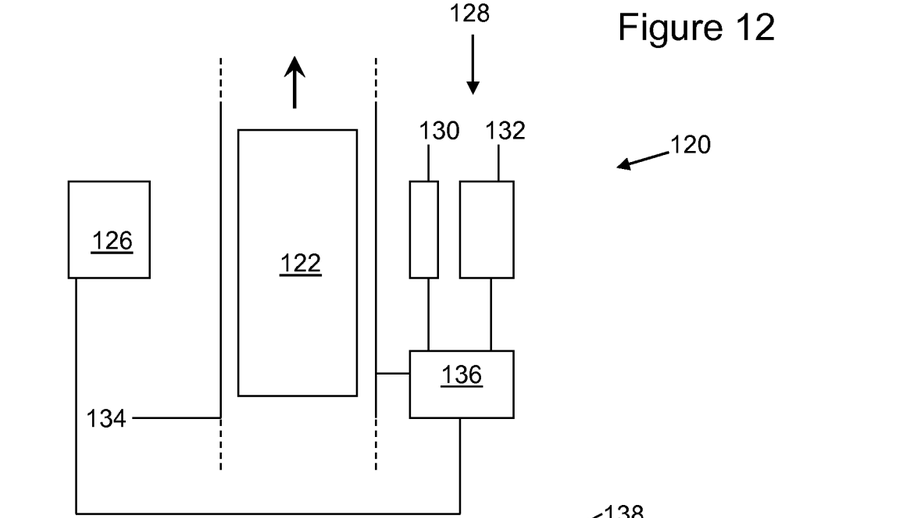
FIG. 12 illustrates a scanning system according to an embodiment of the invention.

Referring to FIG. 12, in another embodiment of the invention, there is provided a system 120 for scanning a moving object 122 in a similar manner to that shown in the embodiment of FIG. 3. A system 120 includes an X-ray source 126 for irradiating the object with high energy radiation (of peak value 900 keV or more). The system 120 also includes a detector arrangement 128 including a first detector 130 and a second detector 132. This embodiment differs from the embodiment shown in FIG. 3 in that the object 122 is provided on a conveyor 134. The object 122 is stationary on the conveyor 134. The system 120 also includes a controller 136 which drives the conveyor and controls its movement. The controller 136 controls the movement of the object 122, and the timing of the X-ray bursts emitted by the source 126 such that each set of detection data is captured at a different time and co-ordinated to provide information on the same region of the object as previously described.

In other embodiments it will be apparent to the skilled person that there are other arrangements which can be used to monitor the movement of the object through a scanning zone and thus to co-ordinate scanning as required by claim 1. A combination of a conveyor and movement sensor may be provided in some useful embodiments.

Figure 14A:
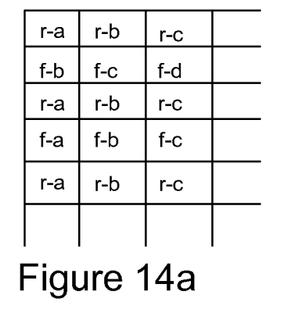
FIGS. 14a and 14b illustrate how image data is displayed to an operator in an embodiment of the invention.
Figure 14B:
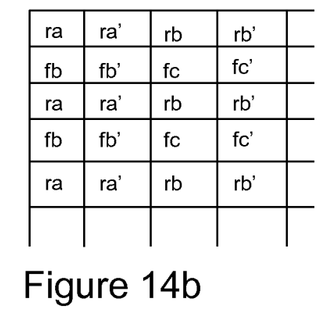

The image data is be displayed in some examples to the operator as shown in FIGS. 14a and 14b. FIG. 14a shows how data should be displayed in low dose mode; r-a means data from a trailing detector element with pulse a, f-b means data from a leading detector element with pulse b. In this case the displayed pixel is rectangular. FIG. 14b shows how data should be displayed in full Nyquist sampling mode. Here ra means data from a trailing detector pulse a while ra' means data from a trailing detector pulse a'. In this case the displayed pixel is square.

It is also possible to display a materials discrimination image in which case the data should be represented as shown in FIG. 14b but this time the pixel should display the ratio value F/R. For example F(ra)/R(ra), F(fb)/R(fb) and so on. The value should be scaled to a suitable set of values such that F/R=1 is scaled to 256 and F/R=0 is scaled to 0, for example, so that the average brightness of the screen that is presented to the operator maintains a comfortable viewing level.

When the operator screen does not have sufficient pixels to display all of the image data, an interpolation can be adopted in both the vertical and horizontal directions as required until the image dimension is matched appropriately to the screen resolution. The high intrinsic spatial resolution of the image data can be used to provide enhanced display zoom functionality over that which can be used with a conventional linear detector array due to the use of full Nyquist sampling, giving a factor of two increase in zoom level over conventional sub-sampled systems.

Various modifications may be made to this invention without departing from its scope (as defined by the claims). The disclosed scanning system wherein the detector arrangement comprises a first detector region arranged to detect radiation and a second detector region arranged to detect radiation wherein the second detector region is arranged to receive radiation that has passed through the first detector region uses an offset detector arrangement to additionally provide Nyquist sampling rate scanning.

In some embodiments the detectors are offset but not sufficiently to achieve the Nyquist sampling rate. In such embodiments the image that is produced still has a greater resolution than a non-offset detector.

I claim:

1. A scanning method for scanning an object moving in a first direction comprising:
    irradiating the object with radiation having a peak energy of at least 900 keV;
    providing a first detector region having a thickness of at least 2 mm and a second detector region having a thickness of at least 5 mm wherein the second detector region is arranged to receive radiation that has passed through the first detector region;
    detecting the radiation after it has interacted with or passed through the object in order to provide information relating to the object;
    wherein detecting the radiation comprises:
        detecting radiation at the first detector region;
        receiving radiation that has passed through the first detector region at the second detector region;
        detecting radiation at the second detector region;
    wherein at the first detector region, the second detector region, or both, detecting the radiation comprises capturing a plurality of sets of detection data using different groups of detection elements;
    each detection element being arranged to provide information relating to a corresponding portion of the object;
    each set of detection data being captured at a different time such that each group of detection elements is arranged to provide information on the same region of the object; and
    wherein the corresponding portions covered by each group are overlapped in a second direction having a component normal to the first direction.

2. The method of claim 1 wherein the first detector region has a thickness of about 15 mm, and the second detector region has a thickness of about 30 mm.

3. The method of claim 1 further comprising the step of sensing the rate of movement of the object in order to coordinate timing of the capturing of the sets of detection data.

4. The method of claim 1 wherein the corresponding portions covered by each group are overlapped to provide information at a spatial frequency sufficient to scan the region of the object at at least the Nyquist sampling rate in the second direction.

5. The method of claim 4 wherein the detection elements have substantially the same length in the second direction and the overlapped portions are overlapped such that, on average, data relating to two portions is captured per length of detection element.

6. The method of claim 1 wherein the different groups of detection elements are offset relative to each other in the first direction.

7. The method of claim 1 comprising providing time-coordinated scan information to imaging means arranged to provide an image of the object.

8. The method of claim 1 comprising controlling movement of the object such that the region is aligned with the relevant group of detection elements at the time of data capture.

9. The method of claim 1 comprising capturing data at a temporal frequency sufficient to provide scanning of the region of the object at least the Nyquist sampling rate in the first direction.

10. The method of claim 1 wherein irradiating the object comprises irradiating the object in discrete bursts and the scanning method comprises sending detected information received in response to a burst from the detection element before the next burst occurs.

11. The method of claim 1 comprising positioning the first detector region between the object and the second detector region.

12. The method of claim 1 comprising calculating the ratio of radiation detected at the first detector region relative to radiation detected at the second detector region in order to the determine information relating to the object based upon the calculated ratio.

13. The method of claim 1 comprising configuring the first detector region and the second detector region to detect a predetermined amount of radiation relative to each other.

14. The method of claim 13 comprising configuring the first detector region and the second detector region to detect substantially the same amount of radiation as each other.

15. The method of claim 13 comprising configuring any one or more of size, shape or material of the or each detector region so that the first detector region and the second detector region detect the predetermined amount of radiation relative to each other.

16. An imaging method for providing an image of an object scanned according to the method of claim 1 comprising the step of aligning different sets of detection data which have been captured at different times and which provide information on the same region of the object in order to provide the image.

17. A detector arrangement for use in a scanning system, the system comprising a radiation source arranged to irradiate with radiation having a peak energy of at least 900 keV an object, moving in a first direction, to be scanned, wherein the detector arrangement is arranged to detect radiation after it has interacted with or passed through the object in order to scan the object;

wherein the detector arrangement comprises a first detector region having a thickness of at least 2 mm and arranged to detect radiation and a second detector region having a thickness of at least 5 mm and arranged to detect radiation wherein the second detector region is arranged to receive radiation that has passed through the first detector region;

wherein the first detector region, the second detector region, or both comprise a detector array comprising a plurality of groups of detection elements, each detection element arranged to capture detection data relating to a corresponding portion of the object, each group being arranged to capture a set of detection data at a different time such that each set of detection data covers the same region of the object; and wherein at least two of the sets of portions are overlapped in a second direction having a component normal to the first direction.

18. The detector arrangement of claim 17 wherein the first detector region has a thickness of about 15 mm, and the second detector region has a thickness of about 30 mm.

19. The detector arrangement of claim 17 wherein the sets of portions are overlapped to provide information at a spatial frequency sufficient to scan the object at least the Nyquist sampling rate in the second direction.

20. The detector arrangement of claim 19 wherein the detection elements have substantially the same length in the second direction and the overlapped portions are overlapped such that, on average, data relating to two portions is captured per length of detection element.

21. The detector arrangement of claim 19 wherein the different groups of detection elements are offset relative to each other in the first direction.

22. The detector arrangement of claim 19 wherein each group comprises an identical set of detection elements.

23. The detector arrangement of claim 17 wherein the groups comprise columns of detection elements extending in the second direction.

24. The detector arrangement of claim 23 wherein the width of a column is one detection element.

25. The detector arrangement of claim 17 wherein the groups are arranged adjacent to each other.

26. The detector arrangement of claim 17 wherein the groups are spaced apart.

27. The detector arrangement of claim 17 wherein the detection elements comprise scintillation crystals.

28. The detector arrangement of claim 17 wherein the first detector region is positioned between the object to be scanned and the second detector region.

29. The detector arrangement of claim 17 wherein the first detector region and the second detector region are configured to detect a predetermined amount of radiation relative to each other.

30. The detector arrangement of claim 29 wherein the first detector region and the second detector region are configured to detect substantially the same amount of radiation as each other.

31. The detector arrangement of claim 29 wherein any one or more of size, shape or material of the or each detector region is arranged so that the first detector region and the second detector region detect the predetermined amount of radiation relative to each other.

32. The detector arrangement of claim 17 comprising a first detector including the first detector region and a second detector including the second detector region.

33. The detector arrangement of claim 32 wherein the first detector is mounted on first mounting means arranged to mechanically support the detector or provide an electronic connection between the first detector and an information output circuit or both and the second detector is mounted on second mounting means arranged to mechanically support the detector or provide an electronic connection between the second detector and an information output circuit or both.

34. The detector arrangement of claim 32 wherein the first detector and the second detector are mounted upon joint mounting means arranged to mechanically support the detectors or provide an electronic connection between the detectors and one or more information output circuits or both.

35. The detector arrangement of claim 33 wherein any one or more of the mounting means comprises a circuit board.

36. The detector arrangement of claim 35 wherein the first detector is mounted upon a first side of the circuit board and the second detector is mounted upon a second opposite side of the circuit board.

37. The detector arrangement of claim 32 wherein one or each of the first detector and the second detector comprises a linear detector array.

38. A scanning system comprising a radiation source arranged to irradiate with radiation having a peak energy of at least 900 keV an object, moving in a first direction, to be scanned, a detector arrangement arranged to detect radiation after it has interacted with or passed through the object in order to provide information to scan the object, wherein the detector arrangement comprises the detector arrangement of claim 17.

39. The scanning system of claim 38 further comprising a movement sensor arranged to sense the rate of movement of the object in order to coordinate timing of the capturing of the sets of detection data such that the groups of detector elements capture different data sets relating to the same region of the object.

40. The scanning system of claim 38 comprising a controller arranged to control movement of the object through the scanning zone so that the groups of detector elements capture different data sets relating to the same region of the object.

41. The scanning system of claim 39 comprising a controller arranged to communicate with the movement sensor and control time of capture of data by a group of detector elements to coordinate with movement of the object through the scanning zone so that the groups of detector elements capture different data sets relating to the same region of the object.

42. The scanning system of claim 38 comprising a controller arranged to calculate the ratio of radiation detected at the first detector region relative to radiation detected at the second detector region in order to the determine information relating to the object based upon the calculated ratio.

43. The scanning system of claim 38 comprising a plurality of detector arrangements.

44. The scanning system of claim 38 wherein one or each detector arrangement comprises a face upon which the radiation is arranged to impact and the face is arranged to face towards the radiation source.

* * * * *